3,822,187
CULTIVATION OF MICRO-ORGANISMS
Jean Amaudric du Chaffaut, 39 Boulevard Saine-Lucie,
  13 Marseille 7e, France, and Bernard Maurice Laine,
  4 Boulevard de Touraine, 13 Lanera, France
No Drawing. Continuation of abandoned application Ser.
  No. 777,474, Nov. 20, 1968. This application Mar. 3,
  1972, Ser. No. 231,712
Claims priority, application Great Britain, Nov. 27, 1967,
    53,744/67
Int. Cl. C12b 1/00
U.S. Cl. 195—28 R                    9 Claims

ABSTRACT OF THE DISCLOSURE

A two stage continuous process for the production of a micro-organism by cultivation on a hydrocarbon substrate and for improving a hydrocarbon feedstock, wherein an essential aqueous phase nutrient is either absent from the second phase or present in insufficient quantity to permit unimpeded growth. Preferably additional water is present in the second stage.

---

This is a continuation of application Ser. No. 777,474 filed Nov. 20, 1968, now abandoned.

This invention relates to a process for the cultivation of a micro-organism.

According to the present invention there is provided a process which comprises cultivating micro-organism in the presence of a petroleum fraction consisting wholly or in part of straight chain hydrocarbons, in the presence of an aqueous nutrient medium and in the presence of a gas containing free oxygen, said petroleum fraction and said aqueous medium being continuously fed to a fermenter containing said micro-organism and wherein takes place a first stage of cultivation of said micro-organism, a product stream comprising the micro-organism being continuously passed to a second stage fermenter, wherein the micro-organism is treated with a second stage aqueous nutrient medium, a product stream comprising micro-organism being continuously removed from the second stage fermenter, said product being treated to recover the micro-organism, in the first stage of cultivation the amount of essential nutrients in the aqueous phase in the first stage fermenter being such that the rate of growth of the micro-organisms is not impeded by shortage of nutrients and in the second stage the amount of at least one nutrient in the aqueous phase in the second stage fermenter being less than the amount required for unimpeded growth of the micro-organism and/or at least one nutrient which is present in the aqueous phase of the first stage fermenter being absent from the aqueous phase of the second stage fermenter.

Preferably the second stage aqueous nutrient medium consists of a mixture of all or part of the first stage aqueous nutrient medium withdrawn from the first stage fermenter together with additional water. If desired the additional water may contain nutrients such as for example nutrient mineral salts.

Preferably the amount of water which is added to the second stage fermenter or which is blended with a feed stream to the second stage fermenter is sufficient to reduce the level of any toxin produced in the first stage aqueous nutrient medium such that said toxin does not substantially impede growth in the second stage. More particularly it is preferred that the amount of water which is added is such that the total proportion by weight of said toxins in the effluent from the second stage is not greater than the proportion of said toxins in the effluent from the first stage.

Preferably the amount of water which is added to the second stage fermenter or which is blended with a feed stream to the second stage fermenter is such that the dilution rate of the operation in the second fermenter is not lower than the dilution rate of the operation in the first stage fermenter. Clearly the amount of water added will thus depend on the ratio of effective volumes of the first stage and second stage fermenters; in certain cases it will be apparent that the desired dilution rate will be achieved in the second fermenter without the addition of water. However, since it is also desirable to maintain a lower level of toxins in the second stage fermenter through the addition of water, the combination of the control of dilution rate, as described hereinbefore, and the reduction in level of toxins will lead to the use of a larger fermenter in the second stage than is employed in the first stage. Usually, but not necessarily, the rate of addition of water will be 1–8 times, and preferably 1–5 times the volume per hour feed rate of the product stream from the first to the second fermenter.

When the second stage aqueous nutrient medium consists of all of the first stage aqueous nutrient medium which is withdrawn from the first stage fermenter together with substantially an equal volume of water, the effective volume of the second stage fermenter will preferably be substantially twice the effective volume of the first stage fermenter.

By selection of the second stage dilution rate as described above, the rate of growth of the micro-organism in the second stage may be maintained at an acceptable level despite the shortage of one or more nutrient constituents and overall there is provided a process which is acceptably efficient in terms of utilisation of nutrients and in terms of overall growth of micro-organism in relation to plant and operational variables.

Most suitably the residence time in the second stage fermenter is 1–10 hours and preferably less than 3–4 hours.

The term "toxin" is used herein with reference to any material, produced in the course of the growth of the micro-organism which retards the growth of the micro-organism.

The term "dilution rate" is used herein with reference to the ratio of the total liquid phase feed rate (in volumes/unit time) to a fermenter to the operational volumes of the fermenter.

If desired the two stages may be operated with a feed rate of a component or iron of the aqueous nutrient at each stage such that the spent aqueous nutrient from the second stage is effectively exhausted of the component or ion. Thus leading to an improvement in the economics of the process since the conditions can be arranged to give the more effective utilisation of a nutrient or nutrients relatively to the yield of micro-organism. For example the quantity of such nutrients as phosphate or potassium present in the spent aqueous medium can be reduced to a minimum. In particular complete utilisation of potassium ions can be achieved.

All process stages may be carried out either continuously or in a batch-wise fashion.

The process including optional process stages will now be described in greater detail.

Micro-organisms which are cultivated as herein described may be yeasts, moulds or bacteria. Within the term "micro-organism" used herein we include mixtures of micro-organisms.

Preferably when a yeast is employed this is of the family Cryptococcaceae and particularly of the sub-family Cryptococcoideae however, if desired, there may be used, for example, ascosporogeneous yeasts of the sub-family Saccharomycetoideae. Preferred genera of the Cryptococcoideae sub-family are Torulopsis and Candida. Preferred species of yeast are as follows. In particular it is preferred to use the specific stock of indicated reference number; these reference numbers refer to CBS stock held by the Centraal Bureau voor Schimmelcultures, Baarn, Holland; to CMI stock held by the Commonwealth Mycological Institute, Kew, England; and to NCYC stock held by the National Collection of Yeast Cultures, Nutfield, England.

| Species | Preferred strain |
|---|---|
| Candida brumptii | |
| Candida catenulata | |
| Candida clausenii | |
| Candida humicola | |
| Candida intermedia | |
| Candida krusei | |
| Candida lipolytica | CBS No. 2078; No. 699. CMI No. 93743. NCYC No. 376; No. 153. |
| Candida melibiosi | |
| Candida parapsilosis | CMI No. 83350. NCYC No. 458. |
| Candida pulcherrima | |
| Candida rugosa | |
| Candida stellatoidea | |
| Candida tropicalis | NCYC No. 4. |
| Candida utilis | CMI No. 2331. |
| Debaryomyces kloeckeri | |
| Hansenula anomala | |
| Pichia guilliermondii | CBS No. 2084; No. 2031. |
| Rhodotorula glutinis | |
| Torulopsis famata | |
| Torulopsis magnoliae | |

Of the above *Candida lipolytica* and *C. tropicalis* are particularly preferred.

If desired the micro-organism may be a mould. Suitable moulds are of the family Moniliaceae; a suitable genus is Penicillium and preferably there is used *Penicillium expansum*. Another suitabe genus is Aspergillus.

If desired the micro-organism may be a bacterium. Suitably the bacteria are of one of the orders: Pseudomonadales, Eubacteriales and Actinomycetales.

Preferably the bacteria which are employed are of the families Corynebacteriaceae, Micrococcaceae, Achromobacteraceae, Actinomycetaceae, Rhizobiaceae, Bacillaceae and Pseudomonadaceae. Preferred species are *Bacillus megaterium*, *Bacillus subtilis* and *Pseudomonas aeruginosa*. Other species which may be employed include:

| | |
|---|---|
| Mycobacterium smegmatis | Nocardia rubra |
| Nocardia erythropolis | Nocardia rubropertincta |
| Nocardia minima | Streptomyces griseolus |
| Nocardia opaca | Streptomyces rimosus |
| Nocardia polychromogenes | |

These bacteria grow in the presence of the following aqueous nutrient medium:

| | Grams |
|---|---|
| $NH_4Cl$ | 0.5 |
| NaCl | 4 |
| $MgSO_4$ | 0.5 |
| $Na_2HPO_4$ | 0.5 |
| $KH_2PO_4$ | 0.5 |

Water to make up to: 1000 mls.

Preferably the pH of this medium is maintained at 7.

A suitable nutrient medium for yeasts and moulds has the composition:

| | Grams |
|---|---|
| Diammonium phosphate | 2 |
| Potassium chloride | 1.15 |
| Magnesium sulphate $7H_2O$ | 0.65 |
| Zinc sulphate | 0.17 |
| Manganese sulphate $1H_2O$ | 0.045 |
| Ferrous sulphate $7H_2O$ | 0.068 |
| Tap water | 200 |
| Yeast extract | 0.025 |

Distilled water (to make up to 1000 mls.)

The growth of the micro-organism used is favoured by the addition to the culture medium of a very small proportion of extract of yeast (an industrial product rich in vitamins of group B obtained by the hydrolysis of a yeast) or more generally the essential yeast nutrilites. The essential yeast nutrilites include biotin, thiamine, inositol, nicotinic acid, pantothenic acid and pyridoxine. The quantity of yeast extract required is preferably of the order 25 parts/million with reference to the aqueous fermentation medium. The quantity of each nutrilite varies between 0.1 part/million for biotin to 10 parts/million for inositol.

Preferably the aqueous nutrient medium is maintained at a desired pH by the step-wise or continuous addition of an aqueous medium of high pH value. Usually, when using moulds or yeasts and in particular when using *Candida tropicalis*, the pH of the nutrient medium will be maintained in the range 3–6 and preferably in the range 4–5. (Bacteria require a higher pH usually 6.5–8). Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25–35° C. When using *Candida tropicalis* the preferred temperature range is 28–32° C.

The take-up of oxygen is essential for the growth of the micro-organism. The oxygen will usually be provided as air. In order to maintain a rapid rate of growth, the air, used to provide oxygen, should be present in the form of fine bubbles under the action of stirring. The air may be introduced through a sintered surface. However there may be used the system of intimate aeration known as "vortex aeration."

As much of the aqueous nutrient medium as possible is separated from the micro-organism by means of decantation. Additionally or alternatively separation is achieved by centrifuging. The resulting fraction containing the micro-organism is then washed with water and subjected to a further separation process such as centrifuging or decantation. This sequence of washing and separation is repeated until the desired amount of residual nutrient has been removed from the fraction containing the micro-organism. The washings, with or without further treatment, may be returned to the growth operation.

The micro-organism is then preferably dried and subjected to solvent extraction.

A yeast which has been freed from the whole or part of its lipids and the contaminating hydrocarbons by one of the methods described hereinbefore and whose taste has been improved is a new industrial product of value for human nutrition.

According to a preferred feature of this invention there is provided a process which comprises cultivating a micro-organism in a manner as hereinbefore described in the presence of a petroleum fraction consisting in part of straight chain hydrocarbons and having a mean molecular weight corresponding to at least 10 carbon atoms per molecule, and in the presence of an aqueous nutrient medium; and in the presence of a gas containing free oxygen, and separating from the mixture, on the one hand, the micro-organism and, on the other hand, a petroleum fraction having a reduced proportion of straight chain hydrocarbons or which is free of said straight chain hydrocarbons and thereafter treating the micro-organism as hereinbefore described.

The process of the invention is of particular value for the treatment of petroleum gas oil fractions which contain straight chain hydrocarbons in the form of waxes, since by the process of the invention a gas oil of improved pour point is obtained while the waxes are converted to a valuable product.

Usually the straight-chain hydrocarbons will be present in the feedstocks according to the invention as paraffins; however, the straight chain hydrocarbons may be present as olefins; also there may be used a mixture containing straight chain paraffins and olefins.

By the application of this process under conditions which limit the assimilation of the straight chain hydrocarbons it is possible to operate with the removal of only a desired proportion of these hydrocarbons.

Suitable feedstocks to the process of the invention include kerosine, gas oils and lubricating oils, these feedstocks may be unrefined or may have undergone some refinery treatment, but must contain a proportion of straight chain hydrocarbons in order to fulfill the purpose of this invention. Suitably the petroleum fraction will contain 3–45% by weight of straight chain hydrocarbons.

The invention is illustrated but not limited with reference to the following Example; Experiments 1 and 2 are provided for purposes of comparison.

EXAMPLE 1

A yeast, *Candida tropicalis,* was grown in a continuously operated first fermenter (F.1) of 6.3 cu. meter working volume in the presence of an aqueous nutrient medium having the following composition:

| | Gram/litre |
|---|---|
| $H_3PO_4$ | 1.55 |
| KCl | 0.93 |
| $Mg(OH)_2$ | 0.063 |
| $MnSO_4H_2O$ | 0.02 |
| $FeSO_4, 7H_2O$ | 0.048 |
| $ZnSO_4, 7H_2O$ | 0.126 |
| Yeast extract | 0.05 |
| $H_2SO_4$ | 1.72 |

Water to make up 1000 ml.

The carbon source was provided by a gas-oil obtained from Iraq crude oil and having the following characteristics:

| | |
|---|---|
| Specific gravity | 0.866 |
| Pour point, °C. | +12 |
| Boiling range, °C. | 270–350 |

180 grams of this gas oil feedstock was mixed with each litre of aqueous nutrient medium. This mixture was fed to the fermenter at the rate of 1260 litres per hour.

The fermenter was maintained at 30° C. and at a pH of 4.2 by continuous admission of gaseous ammonia. Aeration was at the rate of 120 v./v./hr. using vortex stirring.

The total amount of product stream removed continuously, i.e. 1260 litres/hr., was passed to a second fermenter F.2 having a working volume of 12.4 cu. metre.

To this product stream of 1260 litres/hr. was added 49 litres/hr. of gas-oil and 2850 litres/hr. of fresh water and the mixture fed to the second fermenter which was maintained at 30° C. and aerated at the rate of 40 v./v./hr. using vortex stirring.

The second fermenter was maintained at a dilution rate of 0.33 vol./vol./hour.

A product stream was continuously discharged from the second fermenter and decanted. 65% by weight of the aqueous phase was continuously withdrawn and replaced by 65% by weight of tap water.

0.8 kg. of Laural 746 (trade name of an anionic detergent obtained by condensing a mixture of lauric alcohol with ethylene oxide, the product then being sulphated) was added to each cu. metre of the mixture of yeast, residual oil and water.

This mixture was thoroughly stirred and centrifuged to obtain, as separate products, a yeast paste, an aqueous phase and a gas-oil phase.

The yeast paste was re-mixed with tap water at a rate of 1 part by wt. of dry matter for 10 parts by wt. of water and thoroughly stirred and again centrifuged.

The yeast paste which was thus recovered contained 65 to 70% by wt. of water. This paste was dried in a spray drier. The moisture content of the yeast at the outlet of the drier was 5% by wt.

This product was then sent to a continuous extraction train operating countercurrently with 3 stages. To this system was fed (at the first stage) 1 part of the spray dried yeast per 8 parts of a mixture of IPA/water azeotrope (12% water–88% IPA) (fed to the final stage).

Each stage was maintained at 80° C. with stirring. The yeast recovered from the final stage was wetted to a water content of 25% wt. and was sent to a tray-drier.

The yeast was passed from the top to the bottom of the drier and conglomerates formed during this final drying were broken-up.

Operating data and results obtained are shown in the following Table.

EXPERIMENTS 1 AND 2

By way of contrast two separate runs (Experiments 1 and 2) were carried out using a single fermenter. The procedure was as follows:

EXPERIMENT 1

A yeast, *Candida tropicalis,* was grown in a continuously operated fermenter (F.1) of 6.3 cu. metre working volume in the presence of an aqueous nutrient medium having the following compositions:

| | Gram/litre |
|---|---|
| $H_3PO_4$ | 1.55 |
| KCl | 0.93 |
| $Mg(OH)_2$ | 0.063 |
| $MnSO_4H_2O$ | 0.02 |
| $FeSO_47H_2O$ | 0.048 |
| $ZnSO_47H_2O$ | 0.126 |
| Yeast extract | 0.05 |
| $H_2SO_4$ | 1.72 |

Tap water to make up 1000 ml.

The carbon source was provided by a gas-oil obtained from Iraq crude oil and having the following characteristics:

| | |
|---|---|
| Sp. gr. | 0.866 |
| Pour point, °C. | +12 |
| Boiling range, °C. | 270–350 |

The gas-oil feedstock was fed at the rate of 270 litres/hour; the aqueous nutrient medium at the rate of 980 litres/hour.

The fermenter was maintained at 30° C. and at pH: 4.2 by continuous admission of gaseous ammonia; the aeration rate was 765 cu. metre/hour, and the dilution rate was 0.2 vol./vol./hr.

A product stream of 1260 litre/hr. was continuously discharged from the fermenter and subjected to decantation. 65% by weight of the decanted aqueous phase was continuously withdrawn and replaced by 65% by wt. of tap water.

0.8 kg. of Laural 746 was added to each cu. metre of the mixture of yeast, residual oil and water.

This mixture was thoroughly stirred and centrifuged to obtain as separate products: a yeast paste, an aqueous phase, and a gas-oil phase.

Yeast paste was afterwards re-mixed with tap water at a rate of 1 part by wt. of dry matter for 10 parts by wt. of water and thoroughly stirred and again centrifuged.

The recovered yeast paste contained 65 to 70% by wt. of water. This above paste was then sent to a spray drier, at the outlet of which the product obtained contained about 5% of water.

This latter product was then sent to a continuous extraction train operating as described in Example 1. The yeast recovered at the outlet of the continuous extraction train was wetted in order to obtain a water content of 25% by wt. and was then sent to a tray-drier.

The yeast was passed from the top (at a temperature of 60° C. to the bottom of the drier (at a temperature of 110° C.) and conglomerates formed during this final drying were broken up.

Operating data and results obtained are shown in the following Table.

EXPERIMENT 2

A similar run to that described in Experiment 1 was carried out in a continuously operated fermenter (F.2) of 12.4 cu. metre working volume in the presence of the aqueous nutrient medium given in Experiment 1.

The operating conditions, harvesting and solvent extraction of the yeast were carried out according to the procedure described in Experiment 1 with the differences which are illustrated by the operating data given in the following Table.

TABLE

|  | Experiment 1 F. 1 alone | Experiment 2 F.2 alone | Example 1 Fermenters in series | |
|---|---|---|---|---|
|  |  |  | F. 1 | F.2 |
| Working volume, m.³ | 6.3 | 12.4 | 6.3 | 12.4 |
| Individual dilution rate, v./v./hr | 0.2 | 0.2 | 0.2 | 0.33 |
| Overall dilution rate, v./v./hr | 0.2 | 0.2 | 0.22 | |
| Temperature, °C | 30 | 30 | 30 | 30 |
| pH | 4.2 | 4 | 4.2 | 4.2 |
| Aeration, v./v./hr | 120 | 80 | 120 | 40 |
| Fresh gas-oil: |  |  |  |  |
| Specific rate, g./l | 65 | 63 | 180 | (¹) |
| Overall rate, g./l | 65 | 63 | 65 |  |
| Fresh nutrient medium: |  |  |  |  |
| Phosphorus, g./l | 0.505 | 0.510 | 0.505 | (²) |
| Potassium, g./l | 0.488 | 0.480 | 0.488 | (²) |
| Production rate, kg./hr | 9.5 | 11 | 10 | 19.2 |
| Overall rate, kg./hr | 9.5 | 11 | 1,9.2 |  |
| Used nutrient medium: |  |  |  |  |
| Phosphorus, g./l | 0.340 | 0.300 | 0.350 | 0.155 |
| Potassium, g./l | 0.170 | 0.188 | 0.170 | Nil |
| Analytical data on product, percent wt. on dry basis: |  |  |  |  |
| Nitrogen | 10.9 | 11.0 | 10 | 12 |
| Total lipids | 0.8 | 0.9 | 16 | 0.5 |
| Phosphorus | 1.75 | 1.9 | 1.6 | 1.6 |
| Potassium | 2.3 | 2.2 | 2.3 | 1.81 |

¹ Added portion (49).
² No addition of fresh nutrient.

What we claim is:

1. A continuous process for the cultivation of a micro-organism on a hydrocarbon substrate said process comprising cultivating a hydrocarbon-consuming micro-organism in the presence of a petroleum fraction consisting at least in part of straight chain hydrocarbons, in the presence of an aqueous nutrient medium and in the presence of a gas containing free oxygen, said petroleum fraction and said aqueous medium being continuously fed to a fermenter containing said micro-organism and wherein takes place a first stage of cultivation of said micro-organism, a product stream comprising the micro-organism being continuously passed to a second stage fermenter, wherein the micro-organism is treated with a second stage aqueous nutrient medium which consists of a mixture of at least part of the aqueous nutrient medium withdrawn from the first stage fermenter together with additional water at a rate of addition which is 1 to 5 times the volume per hour feed rate of the product stream from the first stage fermenter to the second stage fermenter, a product stream comprising micro-organism being continuously removed from the second stage fermenter, said product being treated to recover the micro-organism, in the first stage of cultivation the amount of essential nutrients in the aqueous phase in the first stage fermenter being such that the rate of growth of the micro-organism is not impeded by shortage of nutrients and in the second stage the amount of at least one nutrient in the aqueous phase in the second stage fermenter being either less than the amount required for unimpeded growth of the micro-organism in the first stage fermenter or at least one nutrient which is present in the aqueous phase of the first stage fermenter being absent from the aqueous phase of the second stage fermenter.

2. A process according to claim 1 in which the total liquid product withdrawn from the first stage fermenter, said product containing in suspension the micro-organism product, is passed to the second stage fermenter.

3. A process according to claim 1 in which the dilution rate used in the operation in the second stage fermenter is not lower than the dilution rate used in the operation in the first stage fermenter.

4. A process according to claim 1 in which the nutrient which is present in the second stage fermenter in an amount which is less than the amount required for unimpeded growth or which is absent from the aqueous phase of the second stage fermenter is potassium.

5. A process according to claim 1 in which the micro-organism is a yeast.

6. A process according to claim 1 in which the micro-organism is the yeast *Candida tropicalis*.

7. A process according to claim 1 in which the petroleum fraction consists at least in part of straight chain hydrocarbons having a mean molecular weight corresponding to at least 10 carbon atoms per molecule.

8. A process according to claim 1 in which the petroleum fraction is a gas oil.

9. A process according to claim 1 in which the nutrient material which is present in the second stage fermenter in an amount which is less than the amount required for unimpeded growth in the first stage fermenter or which is absent from the aqueous phase of the second stage fermenter includes potassium and phosphorus.

References Cited

UNITED STATES PATENTS

| 3,032,476 | 5/1962 | Sher | 195—94 |
| 3,271,266 | 9/1966 | Laine et al. | 195—3 H |

JOSEPH M. GOLIAN, Primary Examiner

U.S. Cl. X.R.
195—115, 117